Patented Sept. 19, 1950

2,522,856

UNITED STATES PATENT OFFICE 2,522,856

REMOVAL OF SALT FROM SEA WATER

Arthur M. Buswell, Urbana, Ill., assignor to the United States of America as represented by the Secretary of the Navy No Drawing. Application August 8, 1945, Serial No. 609,727

6 Claims. (Cl. 210—23)

This invention relates to an improved method for the chemical desalination of saline waters and more particularly to an improved method for the removal of salts and minerals from sea water to convert it from non-potable to potable water.

An object of this invention is to provide an efficient method for the removal of salts and minerals from saline waters so as to produce drinking water of sufficient purity that it can be safely used without any health hazard.

A further object of this invention is to provide an improved method of making drinking water from sea water, which method is suitable for practical application on life boats or life rafts.

A still further object of this invention is to provide a chemical method of converting sea water to drinking water, in which the chemicals used have a minimum weight and volumes as compared to the quantity of sea water to be treated.

With the foregoing and other objects in view, the invention consists in the methods hereinafter described in detail and set forth in the claims.

I have found that certain soluble silver compounds are capable of reacting with the chlorides in sea water, mainly sodium chloride and magnesium chloride, to form substantially insoluble silver chloride, and in addition these soluble silver compounds are capable of removing substantially all of the calcium ions and all but a small proportion of the sodium ions, contained in the sea water. Among such salts, I preferably employ silver fluosilicate, $Ag_2SiF_6$, since it is very soluble and dissociates readily to form a reactive concentration of silver ions ($Ag^+$) for reaction with the chloride ions and a reactive concentration of fluosilicate ions for the precipitation of calcium and sodium ions as calcium fluosilicate and sodium fluosilicate. The reactions may be represented by the following equations:

(I)    $2NaCl + Ag_2SiF_6 \rightarrow Na_2SiF_6 + 2AgCl$
(II)   $MgCl_2 + Ag_2SiF_6 \rightarrow MgSiF_6 + 2AgCl$
(III)  $Ca^{++} + Ag_2SiF_6 \rightarrow CaSiF_6 + 2Ag^+$ Because of the solubility of silver fluosilicate, an excess of this compound over the quantity required for complete reaction with the chloride content of the sea water, should be avoided. It is preferred to have a substantial excess of chlorides in the treated water so that a good safety factor is provided to insure that no silver ions are present in the treated water. Since it is not the object of the invention to provide chemically pure water but rather to provide potable water containing salts in physiologically tolerable proportions, this excess of chlorides need not be objectionable.

The magnesium fluosilicate, formed as shown in Equation II, is soluble, and the sodium fluosilicate, formed as shown in Equation I, is somewhat soluble. In order to remove these objectionable substances, an alkaline calcium compound is added in such proportions as to insure complete removal of the fluosilicate ions, forming the substantially insoluble compound, calcium fluosilicate. It is preferred to employ lime as the calcium compound, preferably in the form of anhydrous calcium oxide because of its lower weight, but other compounds such as calcium hydroxide or hydrated lime may be used. Sufficient of the calcium compound is added to render the sea water distinctly alkaline and to precipitate substantially all of the magnesium ions as magnesium hydroxide, according to the following equation:

(IV)   $Mg^{++} + Ca(OH)_2 \rightarrow Mg(OH)_2 + Ca^{++}$

The above procedure is ordinarily carried out in two steps. The first step is the removal of chloride ions, all of the calcium ions, and most of the sodium ions, by adding silver fluosilicate to the saline water in proportions somewhat less than that required for complete reaction with the chloride ion content of the sea water. After separation of the precipitated solids, such as silver chloride and fluosilicate compounds, by filtration or decantation, the second step is carried out by adding sufficient lime for substantially complete precipitation of magnesium hydroxide and calcium fluosilicate. Upon removal of the precipitated solids, the resulting water contains less than about 8000 P. P. M. of solids, and contains no toxic materials.

While the proportions may be varied to some extent, I have found that most sea water may be effectively treated with about 348 grams of silver fluosilicate per gallon of sea water, and about 12.3 grams of calcium oxide per gallon of sea water. The total weight of treatment materials amounts to 360.3 grams or 0.793 pound per gallon of sea water.

As an example of the process of this invention, 348 grams of silver fluosilicate, in finely divided form, were added to one gallon of sea water, and the mixture was agitated well for several minutes, until the reaction was completed. After permitting the precipitated solids to settle, the liquid was decanted and filtered through a cloth or paper filter into another container. To this liquid, 12.3 grams of lime (CaO) were added with agitation. When the reaction was completed, the solids were allowed to settle, and the supernatant liquid was ready for drinking. The silver fluosilicate removed all but 200 milliequivalents of the chloride ions, all but 380 milliequivalents of sodium, and all of the calcium. The lime precipitated all of the magnesium ions as magnesium hydroxide and all of the fluosilicate ions as calcium fluosilicate, leaving in solution a total of 7546 P. P. M. solids, including 225 milliequivalents of sulfate ions, 200 milliequivalents of chloride ions, 380 milliequivalents of sodium ions, and 42 milliequivalents of potassium ions.

In carrying out this process on board a life boat or life raft, it may be used to supplement the fresh water carried in casks. When one cask becomes empty, it is filled with sea water and the silver fluosilicate is added in the proportions of about 348 grams per gallon of sea water. After mixing well and settling, the liquid is decanted into a second cask, when a second becomes empty. To the second cask, 12.3 grams of lime per gallon of sea water are added with agitation, and after settling, the supernatant liquid is ready for drinking.

In some cases, it is desirable to lower the solids content still further by treatment of the water with a substance which is capable of precipitating sulfates or converting the sulfates in the water to chlorides. I have found that the addition of barium chloride, $BaCl_2$, to water previously treated as above described, in the proportions of about 22.7 grams per gallon of sea water, changes the sulfates to chlorides and lowers the total solids to about 6500 P. P. M. The sulfates in the water are substantially completely precipitated as barium sulfate, which may be removed by filtration or decantation of the supernatant liquid. In addition to lowering the total solids content, this step has the advantage of improving the taste of the water, since chlorides are not as unpalatable as sulfates.

To insure against improper treatment, the chemicals are preferably prepared in packages containing the required amount to treat a given volume of sea water. Each chemical should be separately packaged and clearly labeled to indicate the volume of water to be treated. The chemicals should be packaged in dry, pulverulent form to insure the least possible weight and the highest rate of solution.

While I have described the invention in general as well as specific terms, it is obvious that modifications and variations of the invention may be made without departing from the spirit and scope thereof, and therefore no limitations should be imposed except as indicated in the appended claims.

I claim:

1. In a method of converting sea water to drinking water, the steps which comprise mixing with a quantity of sea water sufficient silver fluosilicate to preciptate substantial proportions of the chloride content of the sea water, and then adding an alkaline calcium compound to precipitate magnesium as magnesium hydroxide and to precipitate calcium fluosilicate with separation of the treated water from the precipitated solids.

2. In a method of converting sea water to drinking water, the steps which comprise mixing with a quantity of sea water a predetermined quantity of silver fluosilicate, sufficient to reduce the chloride content to physiologically tolerable proportions but insufficient to provide an excess of silver fluosilicate, separating the treated water from the precipitated solids, and then further treating the water with sufficient alkaline calcium compound to precipitate substantially all of the magnesium and fluosilicate ions as magnesium hydroxide and calcium fluosilicate, and separating the treated water from the precipitated solids.

3. In a method of converting sea water to drinking water, the steps which comprise mixing dry silver fluosilicate with sea water in quantities sufficient to precipitate a substantial proportion of the chloride content of the sea water, but leaving sufficient excess of chlorides to insure against over-treatment, separating the treated water from the precipitated solids, and then further treating the water with sufficient lime to precipitate substantially all of the magnesium and fluosilicate ions as magnesium hydroxide and calcium fluosilicate, and separating the treated water from the precipitated solids.

4. In a method of converting sea water to drinking water, the steps which comprise mixing silver fluosilicate with sea water in the proportions of about 348 grams of silver fluosilicate per gallon of sea water, permitting the reaction to go to substantial completion, separating the treated water from the precipitated solids, mixing lime with the treated water in the proportions of about 12.3 grams of lime per gallon of sea water, permitting the reaction to go to substantial completion, and separating the treated water from the precipitated solids for drinking purposes.

5. In a method of converting sea water to drinking water, the steps which comprise mixing silver fluosilicate with sea water in the proportions of about 348 grams of silver fluosilicate per gallon of water, mixing lime with the treated water in the proportions of about 12.3 grams of lime per gallon of sea water, and mixing barium chloride with the treated water in the proportions of about 22.7 grams per gallon of sea water, with separation of the treated water from the precipitated solids.

6. In the method of claim 1, the additional step of treating the water with barium chloride to precipitate substantially all sulfates.

ARTHUR M. BUSWELL.

REFERENCES CITED

The following references are of record in the file of this patent:

UNITED STATES PATENTS

| Number | Name | Date |
|---|---|---|
| 2,008,131 | Dieck | July 16, 1935 |
| 2,198,393 | Smit | Apr. 23, 1940 |
| 2,322,689 | Goetz | June 22, 1943 |
| 2,363,020 | Spealman | Nov. 21, 1944 |
| 2,373,884 | Frisch | Apr. 17, 1945 |
| 2,391,258 | Meincke | Dec. 18, 1945 |
| 2,452,179 | Bunting | Oct. 26, 1948 |